(12) United States Patent
Sasaki

(10) Patent No.: US 9,108,542 B2
(45) Date of Patent: Aug. 18, 2015

(54) SEAT RECLINING APPARATUS

(71) Applicant: SHIROKI CORPORATION, Kanagawa (JP)

(72) Inventor: Kazutaka Sasaki, Kanagawa (JP)

(73) Assignee: SHIROKI CORPORATION, Kanagawa (JP)

( * ) Notice: Subject to any disclaimer, the term of this patent is extended or adjusted under 35 U.S.C. 154(b) by 0 days.

(21) Appl. No.: 14/028,603

(22) Filed: Sep. 17, 2013

(65) Prior Publication Data

US 2014/0077561 A1    Mar. 20, 2014

(30) Foreign Application Priority Data

Sep. 18, 2012    (JP) .................................. 2012-204643

(51) Int. Cl.
*B60N 2/02*      (2006.01)
*B60N 2/235*     (2006.01)

(52) U.S. Cl.
CPC .................................. *B60N 2/2356* (2013.01)

(58) Field of Classification Search
CPC ....... B60N 2/235; B60N 2/2356; A47C 1/024
USPC .................................. 297/366, 367 R, 367 P
See application file for complete search history.

(56) References Cited

U.S. PATENT DOCUMENTS

| 6,010,191 | A  | * | 1/2000 | Calinaud et al. | .......... | 297/367 R |
| 7,950,742 | B2 | * | 5/2011 | Endo et al. | ................. | 297/367 P |
| 2010/0026072 | A1 | * | 2/2010 | Uramichi et al. | ......... | 297/367 R |
| 2010/0052393 | A1 | * | 3/2010 | Mitsuhashi et al. | ...... | 297/367 R |
| 2011/0062760 | A1 | * | 3/2011 | Zellmann et al. | ......... | 297/367 R |

FOREIGN PATENT DOCUMENTS

JP    2012-51466 A    3/2012

OTHER PUBLICATIONS

Patent Abstracts of Japan for JP 2012-051466.

* cited by examiner

*Primary Examiner* — Philip Gabler
(74) *Attorney, Agent, or Firm* — Millen, White, Zelano & Branigan, P.C.

(57) ABSTRACT

A seat reclining apparatus includes a base plate, a ratchet plate, a lock member supported on a surface of the base plate which faces the ratchet plate so that the lock member is movable between engaged and disengaged positions, a rotational cam positioned between the base plate and the ratchet plate and rotates relative thereto by an operation of an operating member, and a welding protrusion which protrudes from the outer side of the base plate and is engaged with a holding portion. The welding protrusion includes a welding portion which is positioned closer to an outer peripheral side of the base plate than the outer toothed portion of the lock member in the engaged position, and a weld is applied so as to extend over the welding portion and an outer edge of the holding portion.

8 Claims, 13 Drawing Sheets

Rear ←——→ Front

Front ←——→ Rear

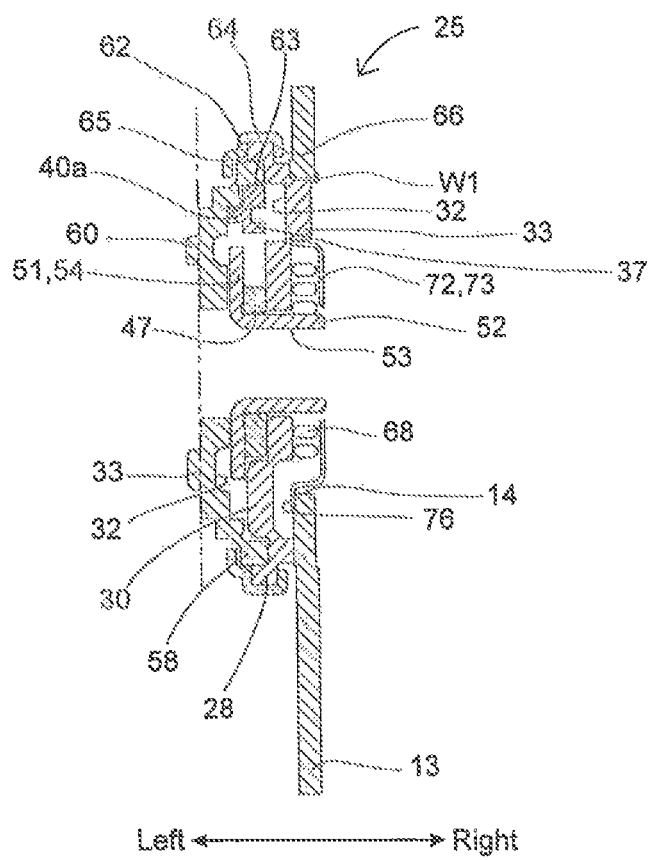
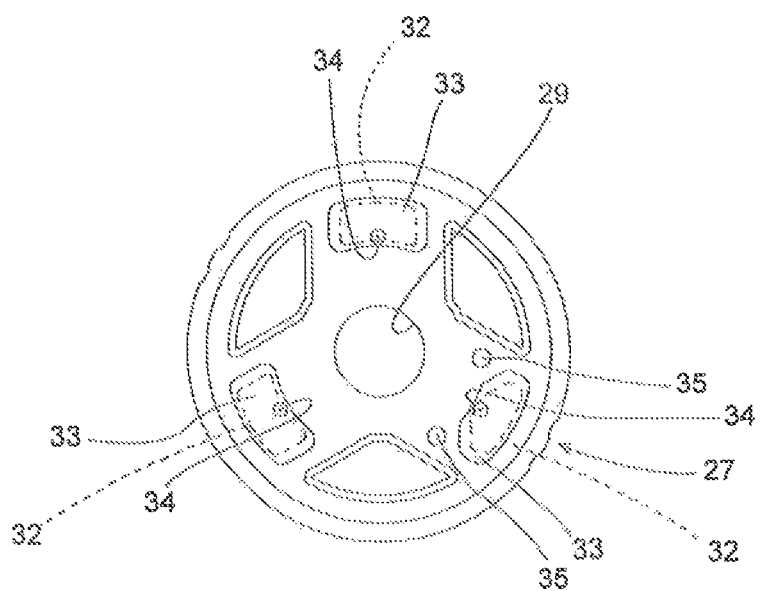

SEAT RECLINING APPARATUS

BACKGROUND OF THE INVENTION

1. Field of the Invention

The present invention relates to a seat reclining apparatus for adjustment of the seatback angle of a reclining seat.

2. Description of Related Art

Japanese Unexamined Patent Publication No. 2012-51466 discloses a known seat reclining apparatus which includes a base plate which is fixed to a seat cushion side frame, a ratchet plate (ratchet) which is fixed to a seatback side frame and provided on the inner periphery thereof with an annular internal gear, a rotational center shaft (hand-operated shaft) for the base plate and the ratchet plate, three lock members (pawls) which are supported on an inner side of the base plate (a surface of the base plate which faces the ratchet plate) thereby to be movable (slidable) relative to the base plate in radial directions of the rotational center shaft, a rotational cam which rotates with the rotational center shaft, and a lock spring (spiral spring) which biases and rotates the rotational center shaft.

An outer toothed portion is formed on an outer peripheral surface of each lock member. Each lock member is movable relative to the base plate (the associated guide groove) between an engaged position in which the outer toothed portion is engaged with the internal gear of the ratchet plate and a disengaged position in which the outer toothed portion is disengaged radially inwards from the internal gear of the ratchet plate.

The rotational cam is rotatable between a locked position, to position each lock member in the engaged position, and an unlocked position, to position each lock member in the disengaged position. The lock spring biases the rotational center shaft in a direction so as to rotate the rotational cam toward the locked position.

Welding protrusions are projected from an outer side of the base plate (a surface of the base plate which faces the seat cushion side frame). The welding protrusions can be engaged in a holding portion which is formed in the seat cushion side frame as a through-hole (note that neither the seat cushion frame nor the holding portion is disclosed in Japanese Unexamined Patent Publication No. 2012-51466). The welding protrusions are fixed to the seat cushion side frame by welding an outer peripheral edge of each welding protrusion to the seat cushion side frame (an outer edge of the holding portion).

When an operating lever (hand-operated lever) which is linked with the rotational center shaft is not manually rotated, the rotational cam rotates toward the locked position by the rotational biasing force of the lock spring, which causes each lock member to move toward the engaged position. Accordingly, the outer toothed portion of each lock member is engaged with the internal gear of the ratchet plate, so that the seatback side frame (seatback) becomes non-rotatable relative to the seat cushion side frame (seat cushion).

On the other hand, the operating lever is manually rotated against the rotational biasing force of the lock spring, the rotational cam moves to the unlocked position. Thereupon, each lock member having moved to the engaged position moves toward the disengaged position, which causes the outer toothed portion of each lock member to be disengaged from the internal gear of the ratchet plate. As a result, the seatback side frame (seatback) becomes rotatable relative to the seat cushion side frame (seat cushion) (i.e., the angle of the seatback becomes adjustable relative to the seat cushion).

The aforementioned welding protrusions of the seat reclining apparatus disclosed in the above-mentioned Japanese Unexamined Patent Publication No. 2012-51466 are positioned closer to the center of the base plate (closer to the inner peripheral side of the base plate) than the outer toothed portion (the outer periphery) of each lock member in the engaged position.

If welding is applied so as to extend over an outer peripheral edge of each welding protrusion and the seat cushion side frame (an outer edge of the aforementioned holding portion of the seat cushion side frame), heat caused by welding reaches the inner side of the base plate through the inside of the base plate. Consequently, this heat eventually reaches the lock member support portion on the inner side of the base plate because the welding protrusions are positioned closer to the center of the base plate (closer to the inner peripheral side of the base plate) than the outer toothed portion (the outer periphery) of each lock member in the engaged position.

Thereupon, the lock member support portion of the base plate (the inner side of the base plate) may be deformed (e.g., deformed to bulge toward the lock member) by the aforementioned heat caused by welding, so that each lock member may become incapable of sliding smoothly on the inner side (the lock member support portion) of the base plate.

SUMMARY OF THE INVENTION

The present invention provides a seat reclining apparatus which is structured to reduce the possibility of movement of the lock member (s) relative to the base plate becoming unsmooth due to heat of welding applied between one or more welding protrusions and a holding portion (welding-protrusion holding portion) formed as a hole in either the seat cushion side frame or the seatback side frame even though the seat reclining apparatus is structured such that the welding protrusion (s) that is engaged in the holding portion protrudes from the outer side of the base plate that supports the lock member (s) by the inner side thereof in a manner to allow the lock member (s) to move on the inner side thereof.

According to an aspect of the present invention, a seat reclining apparatus is provided, including a base plate, an outer side of which faces one of a seat cushion side frame and a seatback side frame; a ratchet plate which includes an internal gear, the ratchet plate being fixed to the other of the seat cushion side frame and the seatback side frame so as to face the base plate while being rotatable relative thereto; a lock member supported on a surface of the base plate which faces the ratchet plate so that the lock member is movable between an engaged position in which an outer toothed portion formed on an outer peripheral surface of the lock member is engaged with the internal gear of the ratchet plate and a disengaged position in which the outer toothed portion is disengaged from the internal gear of the ratchet plate toward an inner peripheral side; a rotational cam which is positioned between the base plate and the ratchet plate and rotates relative to the base plate and the ratchet plate in association with an operation of an operating member between a locked position to position the lock member in the engaged position and an unlocked position to position the lock member in the disengaged position; and a welding protrusion which protrudes from the outer side of the base plate and is engaged with a holding portion, which is formed as one of a through-hole and a bottomed hole in the one of the seat cushion side frame and the seatback side frame. The welding protrusion includes a welding portion which is positioned closer to an outer peripheral side of the base plate than the outer toothed portion of the lock member in the engaged position, and a weld is applied so as to extend over the welding portion and an outer edge of the holding portion.

In the seat reclining apparatus according to the present invention, the welding protrusion, which protrudes from the outer side of the base plate, is provided with the welding portion that is positioned closer to the outer peripheral side of the base plate than the outer toothed portion of the lock member in the engaged position.

Therefore, even when welding is applied so as to extend over the welding portion of the welding protrusion and an outer edge of the holding portion, the possibility of heat caused by the welding reaching the inner side of the base plate (a surface of the base plate which supports the lock member) through the inside of the base plate is small.

Accordingly, the possibility of the lock member support surface of the base plate being deformed (e.g., deformed to bulge toward the lock member) by the aforementioned heat caused by welding to thereby make the lock member incapable of sliding smoothly on the inner side (the lock member support portion) of the base plate is small.

It is desirable for the base plate to be a press-molded product, wherein a protrusion-corresponding recess is formed in the surface of the base plate, which faces the ratchet plate, at a position corresponding to a position of the welding protrusion, and for the lock member and the protrusion-corresponding recess to be positioned to face each other.

Accordingly, although there is a slight possibility of heat caused by the weld that extends over the welding portion of the welding protrusion and an outer edge of the holding portion reaching the protrusion-corresponding recess to thereby deform a surface of the protrusion-corresponding recess, since the lock member that is supported by the inner side of the base plate is spaced from the inner surface of the protrusion-corresponding recess, even if the surface of the protrusion-corresponding recess is deformed, there is no possibility of this deformation making movement of the lock member on the base plate unsmooth.

It is desirable for the welding protrusion to include a pair of side end surfaces which are flat and spaced from each other in a rotational direction of the ratchet plate relative to the base plate, and for the holding portion to include a pair of flat portions which face the pair of side end surfaces of the welding protrusion, respectively.

Accordingly, a large contact area in a circumferential direction between the holding portion (formed in either the seat cushion side frame or the seatback side frame) and the welding protrusion (formed on the base plate) can be secured. Therefore, even if a collision load occurs between the pair of side end surfaces of the welding protrusion and the pair of flat portions of the holding portion due to, e.g., a vehicle which incorporates the seat reclining apparatus colliding with another vehicle, a high resistance to this collision load can be expected.

The present disclosure relates to subject matter contained in Japanese Patent Application No 0.2012-204643 (filed on Sep. 18, 2012) which is expressly incorporated herein by reference in its entirety.

BRIEF DESCRIPTION OF THE DRAWINGS

The present invention will be discussed below in detail with reference to the accompanying drawings, in which:

FIG. 12 is a cross sectional view taken along the line XII-XII shown in FIG. 7, viewed in the direction of the appended arrows;

FIG. 13 is an external side (right-side) elevational view of a base plate shown in FIGS. 2 and others;

DESCRIPTION OF THE EMBODIMENTS

Figure 1:
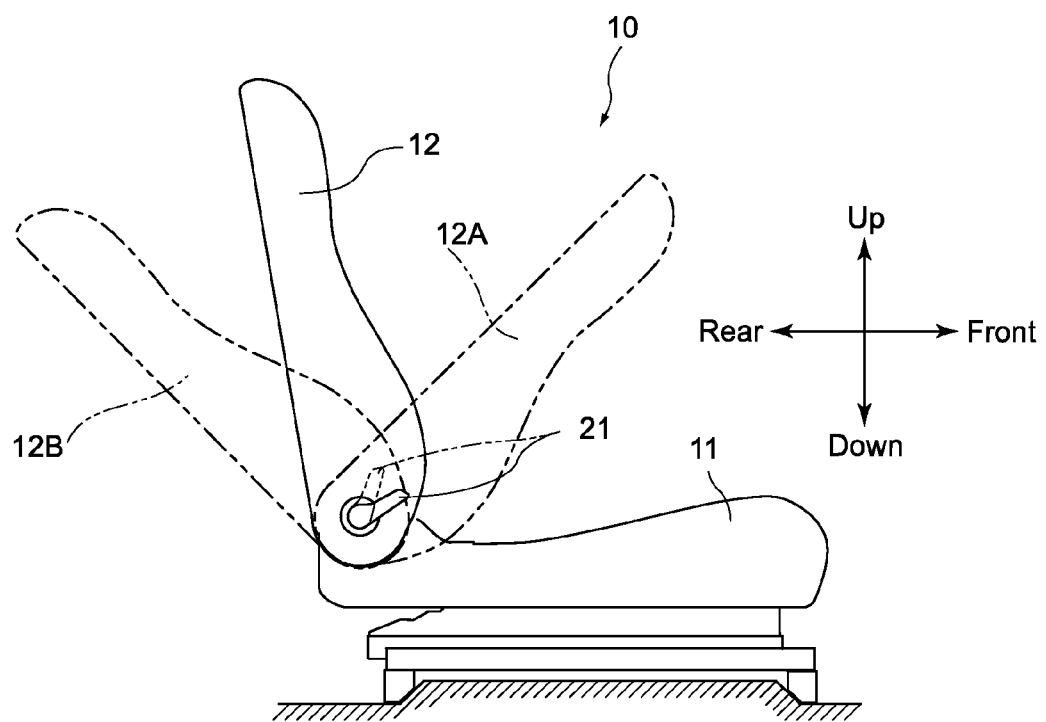
FIG. 1 is a side elevational view of a vehicle seat to which an embodiment of a seat reclining apparatus according to the present invention has been applied.

An embodiment of the present invention will be hereinafter discussed with reference to FIGS. 1 through 25. Directions described in the following description are defined based on the directions of arrows shown in the drawings. In the following description, the term "inner peripheral side" refers to the center side of a base plate 27 of the seat reclining apparatus 25 and the term "outer peripheral side" refers to the radially opposite side of the base plate 27 from the center side thereof.

A vehicle seat 10 shown in FIG. 1 is a right-side seat and is provided with a seat cushion 11 which is supported by a vehicle interior floor of a vehicle (e.g., an automobile) via a seat rail, and a seatback 12 which is rotatable relative to (pivoted at) the rear of the seat cushion 11. A pair of left and right seat cushion frames, made of metal, are installed inside the seat cushion 11 in a fixed state. Each seat cushion frame is a plate-shaped member extending in the forward/rearward direction (horizontal direction with respect to FIG. 1), and the rear end of each seat cushion frame includes a rear frame (seat cushion side frame) 13 (see FIG. 2, etc.), made of metal, which projects upward. The rear frame 13 is provided with a seat-cushion-side connecting hole 14 formed as a circular through-hole with three engaging holes 15 formed at intervals of 120 degrees (i.e. at equi-angular intervals) at the circumference thereof. The three engaging holes 15 are formed in such a manner to be recessed radially outwards from the circumference of the seat-cushion-side connecting hole 14. Each engaging hole 15 is substantially rectangular in shape, and both ends of each engaging hole 15 in the lengthwise direction thereof (circumferential direction about the center of the seat-cushion-side connecting hole 14) are formed by two flat portions 15a which are parallel to each other. The vehicle seat 10 is provided inside the seatback 12 with a pair of left and right seatback side frames 16 (only a lower part of the right seatback side frame 16 is shown by two-dot chain lines in FIG. 2) made of metal which are installed in a fixed state (see FIG. 2). Each seatback side frame 16 is a plate-shaped member extending in the lengthwise direction of the seatback 12. Each seatback side frame 16 is provided, in a lower portion thereof (which becomes a rear portion thereof when the seatback 12 is tilted forward), with a seatback-side connecting hole 17 formed as a through-hole which includes a substantially square-shaped hole and a total of four fitting holes 18 which are respectively formed on the four sides of the aforementioned square-shaped hole. Each fitting hole 18 is substantially rectangular in shape.

The left and right rear frames 13 are installed in the internal space of the seatback 12. The left and right seatback side frames 16 are positioned in between the left and right rear frames 13. The left seatback side frame 16 and the left rear frames 13 face each other in the leftward/rightward direction (vehicle widthwise direction) and the right seatback side frame 16 and the right rear frames 13 face each other in the leftward/rightward direction (vehicle widthwise direction). The left rear frame 13 and the left seatback side frame 16 are connected to each other to be rotatable via a rotational connecting shaft (not shown). On the other hand, the right rear frame 13 and the right seatback side frame 16 are connected to each other via a seat reclining apparatus 25 to be rotatable about an axis extending in the leftward/rightward direction.

The seatback 12 (the seatback side frames 16) is rotatable about the aforementioned rotational connecting shaft and the seat reclining apparatus 25 relative to the seat cushion 11 (the rear frames 13). Specifically, the seatback 12 (the seatback side frames 16) is rotatable between a forwardly-tilted position shown by a two-dot chain line designated by 12A in FIG. 1 and a rearward-tilted position shown by a solid line designated by 12B in FIG. 1.

The detailed structure of the seat reclining apparatus 25 will be discussed hereinafter.

The seat reclining apparatus 25 is provided with the base plate 27, two lock members (pawls) 36, a lock member (pawl) 37, a wedge (second cam) 41, a rotational cam 47, a rotational center shaft 51, a ratchet plate 57, a retaining ring 64, a lock spring 68 and a spring cover 72, which are major elements of the seat reclining apparatus 25.

The base plate 27 is a metal disk member which is formed by press molding. The base plate 27 is provided on the outer edge of the left side thereof with a projecting large-diameter annular flange 28. The base plate 27 is provided with an accommodation space radially inside of the large-diameter annular flange 28. The base plate 27 is provided at a center thereof with a bearing hole 29 formed as a through-hole which is circular in cross sectional shape. The base plate 27 is provided on the left side thereof with three groove-forming projections 30 (see FIGS. 21 through 24) which project and are arranged at intervals of 120 degrees about the bearing hole 29. Each groove-forming projection 30 is substantially in the shape of a sector. The three groove-forming projections 30 are formed by pressing the right side of the base plate 27 leftward using a mold when the base plate 27 is formed by press molding. As shown in the drawings, a circular-arc-shaped clearance is formed between the outer periphery of each groove-forming projection 30 and the large-diameter annular flange 28. Both side surfaces of each groove-forming projection 30 (with respect to the circumferential direction of the base plate 27) are formed as flat guide surfaces 30a, and the flat guide surfaces 30a (opposed surfaces) of any two adjacent groove-forming projections 30 (which face each other in the circumferential direction) are parallel to each other, and a guide groove 31 is formed therebetween. The base plate 27 is further provided, on the right side thereof on the opposite sides from the three guide grooves 31, with a total of three welding protrusions 33 (see FIGS. 2, 4, 6, etc.), respectively, which project rightward. The three welding protrusions 33 are formed by pressing the bottoms (left side surfaces) of the three guide grooves 31 rightward by a mold when the base plate 27 is formed by press molding. The base plate 27 is further provided at the bases of the three guide grooves 31 with three protrusion-corresponding recesses 32 which are formed by the mold (which presses left side surfaces the bases of the three guide grooves 31) on the opposite sides from the three welding protrusions 33, respectively (see FIGS. 8, 9, 10, 12 and 13). Each welding protrusion 33 is substantially rectangular in shape, and both end surfaces of each welding protrusion 33 in the lengthwise direction thereof are formed as side end surfaces 33a which are flat surfaces parallel to each other. In addition, a retaining projection 34 is formed on a center portion of the inner periphery of each welding protrusion 33 to project slightly toward the center of the base plate 27 (toward the inner peripheral side). The base plate 27 is further provided, on the right side thereof in the vicinity of the front welding protrusion 33 (the right welding protrusion 33 with respect to FIG. 13), with a pair of lock projections 35 which project rightward (see FIGS. 2, 13 and 14).

Figure 21:
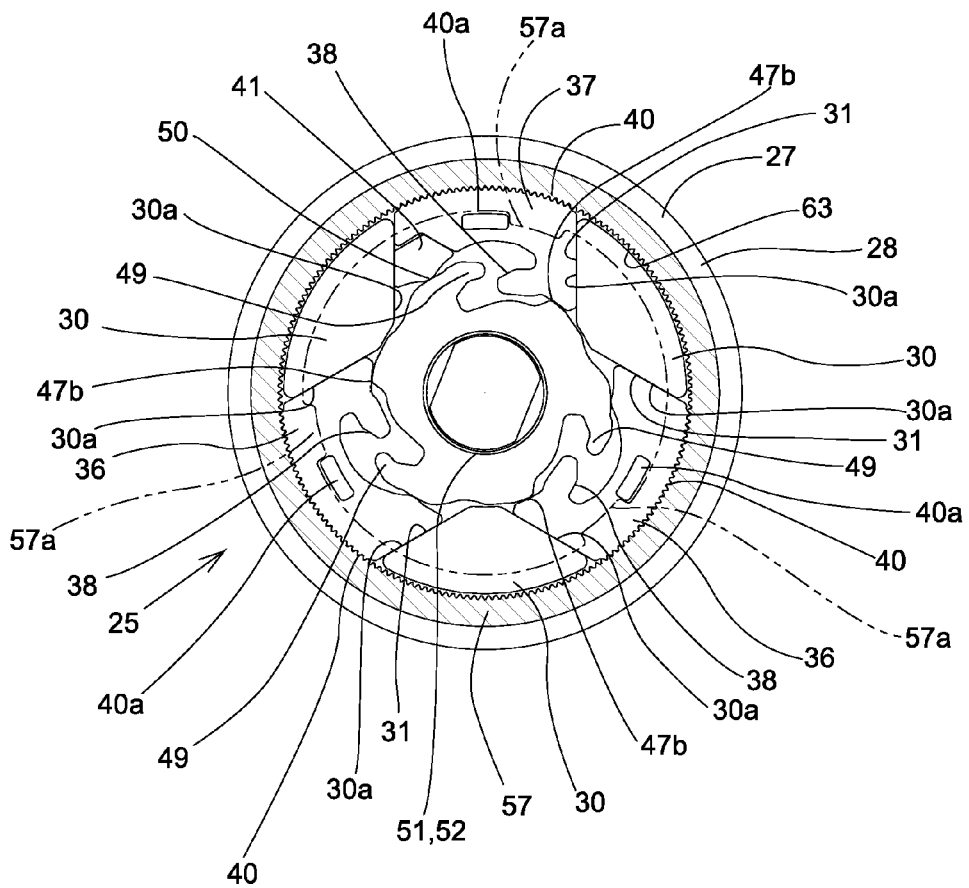
FIG. 21 is a cross sectional view taken along the line XXI-XXI shown in FIG. 8, viewed in the direction of the appended arrows, from which the seat cushion side frame, a retaining ring, rotation-stop pins and an annular flange are removed for clarity.

The two lock members 36 are installed in two of the three guide grooves 31, specifically in the front guide groove 31 (the left guide groove 31 with respect to FIG. 21) and the rear guide groove 31 (the right guide groove 31 with respect to FIG. 21), and the lock member 37 and the wedge 41 are installed in the upper guide groove 31 (the upper guide groove 31 with respect to FIG. 21).

Figure 24:
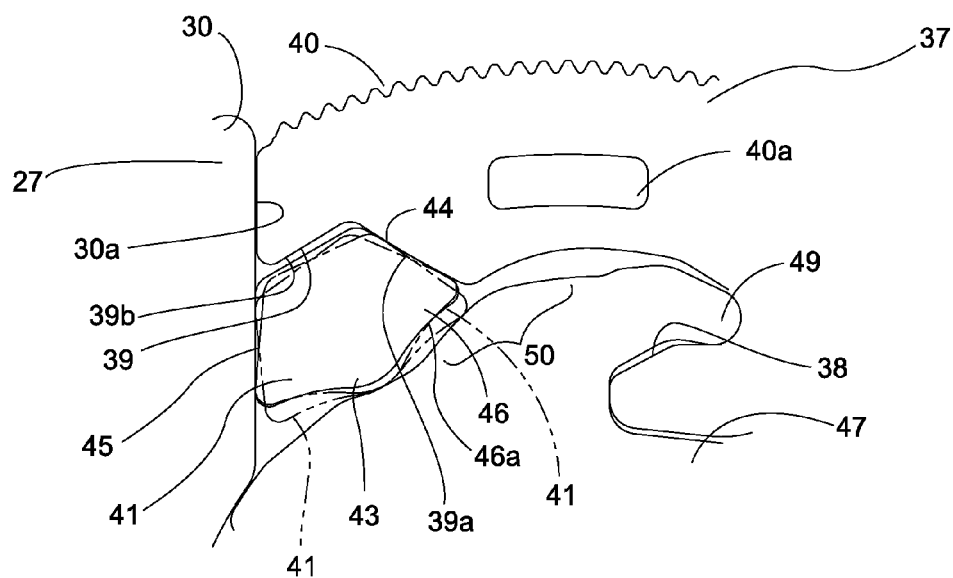
FIG. 24 is an enlarged view of a portion of the seat reclining apparatus which is designated by the Roman numeral XI shown in FIG. 22.

The two lock members 36 and the lock member 37 are press-molded products made of metal plates, and the thicknesses of the three lock members 36 and 37 are substantially the same as the depths of the three guide grooves 31. A cam groove 38 is formed in each of the three lock members 36 and 37, while a wedge-engaging groove 39 is formed only in the lock member 37. As shown in FIG. 24, the wedge-engaging groove 39 is provided with a circumferential parallel portion 39b, which extends substantially parallel to the circumferential direction about the axis of the base plate 27, and a pressed portion (pressure-receiving portion/abutment portion) 39a, which extends obliquely toward the inner peripheral side from one end (the right end with respect to FIG. 24) of the circumferential parallel portion 39b. The pressed portion 39a is not linear (flat) in shape, but rather is a curved surface which is convex toward the space formed by the wedge-engaging groove 39 (toward the wedge 41; toward the left down side with respect to FIG. 24) (however, the curvature of the pressed portion 39a is extremely small, so that the pressed portion 39a appears to be substantially straight to the naked eye). The two lock members 36 and the lock member 37 are each provided on the circular-arc-shaped outer peripheral surface thereof with an outer toothed portion 40. In addition, the right side surfaces of each lock member 36 and 37 are flat surfaces. Additionally, each lock member 36 and 37 is provided on the left side thereof with an engaging projection 40a which projects leftward and has a substantially rectangular cross sectional shape.

The wedge 41, which can be installed in the space formed by the wedge-engaging groove 39 of the wedge-engaging groove of the lock member 37, is a press-molded product made of a metal plate. The wedge 41 has smaller outside dimensions than the two lock members 36 and the lock member 37 and has substantially the same thickness as that of the two lock members 36 and the lock member 37.

Figure 25:
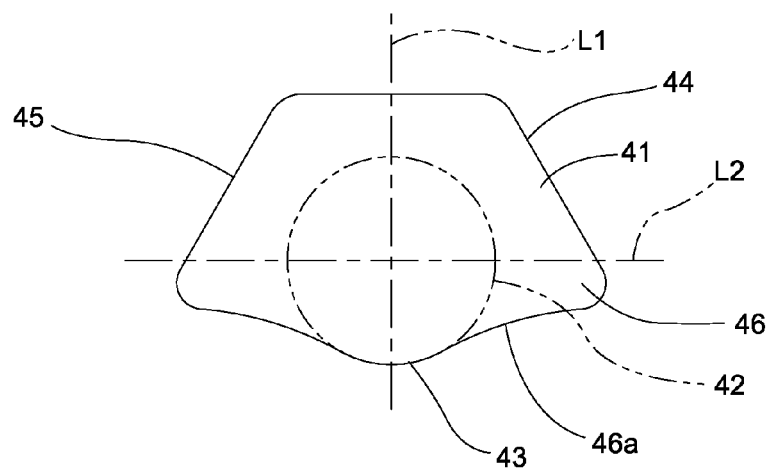
FIG. 25 is an enlarged view of a wedge shown in FIGS. 2 and others.

The wedge 41 is symmetrical in shape with respect to a straight line L1 as shown in FIG. 25, and both the left and right sides of the wedge 41 lie flat on parallel planes. The wedge 41 is provided on the periphery thereof with an engaging portion 43, a pressing portion 44 and a slide-contact flat surface (surface contact portion) 45. The straight line L1 passes between the pressing portion 44 and the slide-contact flat surface 45. The peripheral surface of the engaging portion 43 is a circular arc surface which corresponds to a portion of an imaginary cylindrical surface 42 (the straight line L1 passing through the central axis thereof) positioned inside the wedge 41. The aforementioned curvature of the pressed portion 39a of the lock member 37 is smaller than the curvature of the engaging portion 43 of the wedge 41. The pressing portion 44 and the slide-contact flat surface 45 of the wedge 41, which are formed to be symmetrical with respect to the straight line L1, are positioned outside the imaginary cylindrical surface 42 and are each formed from a flat surface inclined to the straight line L1. The wedge 41 is further provided with a clearance-forming portion 46 which is positioned on the engaging portion 43 side (the lower side with respect to FIG. 25) of a straight line L2 which is orthogonal to the straight line L1 and passes through the axis of the imaginary cylindrical surface 42. The clearance-forming portion 46 is formed of a portion of the wedge 41 which is positioned on the engaging portion 43 side of a straight line L2 and positioned outside the imaginary cylindrical surface 42 (specifically on the right-hand side of the imaginary cylindrical surface 42 with respect to FIG. 25). A concave surface 46a (concave toward the inside of the wedge 41) which is continuous with the engaging portion 43 is formed on a peripheral surface of the clearance-forming portion 46.

Figure 22:
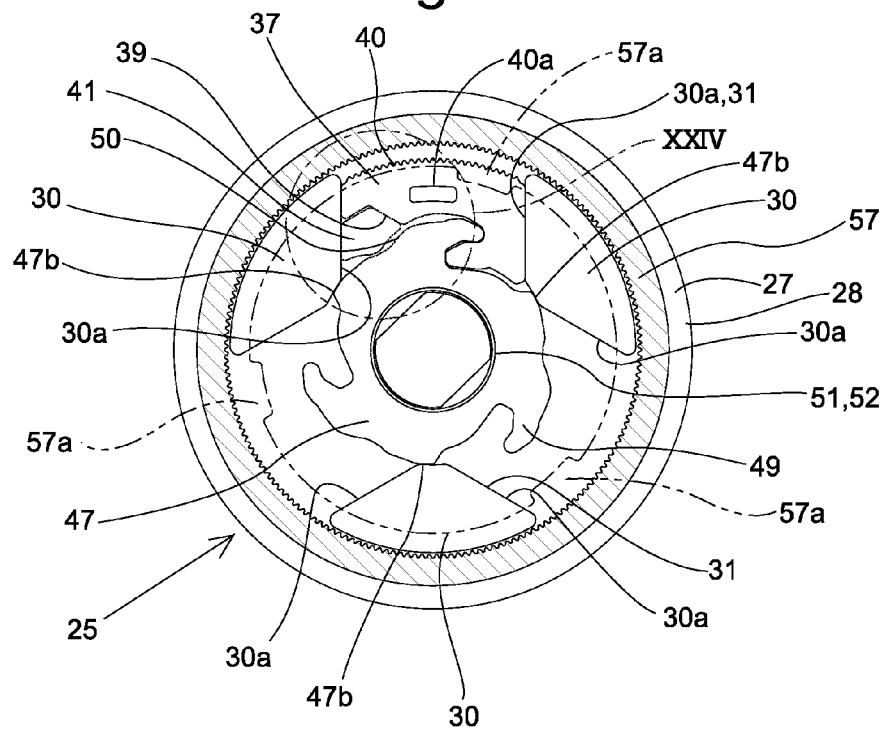
FIG. 22 is a view similar to that of FIG. 21, showing the seat reclining apparatus in an unlocked state from which two lock members are further removed for clarity.
Figure 23:
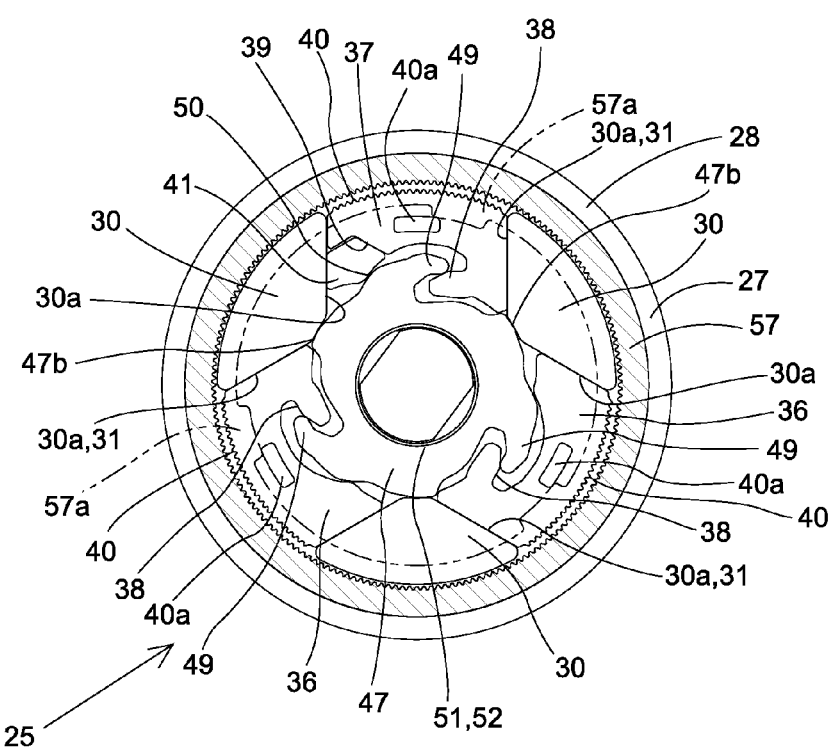
FIG. 23 is a view similar to that of FIG. 21, showing the seat reclining apparatus in an unlocked-state holding state.

The lock members 36, the lock member 37 and the wedge 41 are provided in the respective guide grooves 31 as shown in FIGS. 21 through 23. The right side surfaces of the lock members 36, the lock member 37 and the wedge 41 are all in surface contact with base (flat) surfaces (left side surfaces) of the guide grooves 31, respectively.

Figure 20:
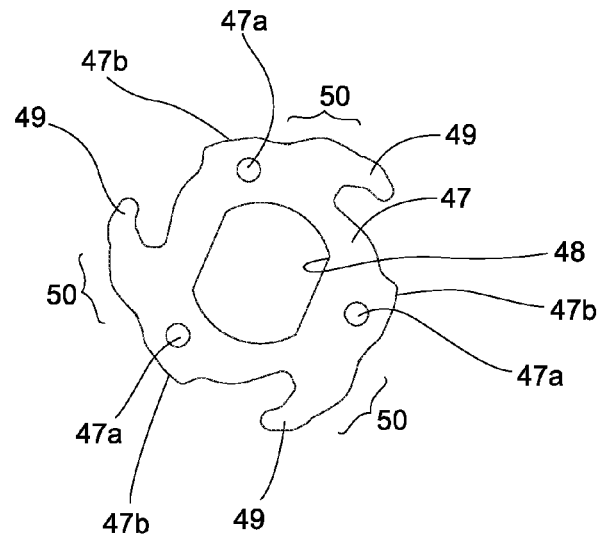
FIG. 20 is a left-side elevational view of a rotational cam (first cam) shown in FIGS. 2 and others.

The rotational cam 47 is a press-molded product made of a metal plate and substantially identical in thickness to the three guide grooves 31. The rotational cam 47 is provided in the center thereof with a non-circular center hole 48, which is formed as a through-hole that is shaped as a circle with linearly cut-off opposite sides. The rotational cam 47 is provided, on the outer periphery thereof at intervals of 120 degrees, with three cam projections 49. As shown in the drawings, the rotational cam 47 is installed in the center of the aforementioned accommodation space of the base plate 27. As shown in FIG. 20, etc., the rotational cam 47 is provided, on the left side thereof at equi-angular intervals in the circumferential direction, with three rotation retaining projections 47a which project leftward. The three rotation retaining projections 47a are columnar in shape and mutually identical in specification. As shown in FIGS. 20 and 24, the rotational cam 47 is provided on the outer peripheries of the three cam projections 49 with three curved pressing surfaces 50, respectively, which are convex toward the outer peripheral side. The rotational cam 47 is further provided, on the outer periphery thereof at equi-angular intervals at different positions from the three curved pressing surfaces 50, with three lock-member pressing portions 47b.

The rotational center shaft 51 is made of metal and provided with a cam connecting shaft 52 and an annular flange 54.

The cam connecting shaft 52 is a tubular member having a non-circular cross section. Both ends of the cam connecting shaft 52 are open as clearly shown in FIG. 19. The cam connecting shaft 52 is geometrically similar in cross sectional shape to and slightly smaller in size than the non-circular center hole 48. The cam connecting shaft 52 is provided therein with a connecting hole 53 which is also geometrically similar in cross sectional shape to the non-circular center hole 48.

The annular flange 54 is integrally formed on the rotational center shaft 51 to project radially outwards from the left end of the cam connecting shaft 52. The annular flange 54 is in the shape of a flat plate orthogonal to the axis of the cam connecting shaft 52.

In addition, the annular flange 54 is provided at equi-angular intervals in the circumferential direction thereof with a total of six through-holes: a pair of small-diameter circular holes 55a, a pair of large-diameter through-holes 55b and a pair of elongated holes 55c. The pair of small-diameter circular holes 55a are circular holes identical in diameter to the three rotation retaining projections 47a. The pair of large-diameter through-holes 55b are circular holes slightly greater in diameter than the pair of small-diameter circular holes 55a (the rotation retaining projections 47a). The pair of elongated holes 55c are elongated holes which are shaped such that the minor diameter of each elongated hole 55c is identical to the diameter of each small-diameter circular hole 55a (each retaining projection 47a) and that the major diameter of each elongated hole 55c is greater than the diameter of each small-diameter circular hole 55a (each retaining projection 47a).

The rotational center shaft 51 is fixed to the rotational cam 47 with the two lock members 36, the lock member 37, the wedge 41 and the rotational cam 47 arranged in a clearance between the annular flange 54 and the base plate 27 and with the three rotation retaining projections 47a of the rotational cam 47 respectively engaged in one of the pair of small-diameter circular holes 55a, one of the pair of large-diameter through-holes 55b and one of the pair of elongated holes 55c. The cam connecting shaft 52 is loosely fitted into the non-circular center hole 48 of the rotational cam 47, and the end (right end) of the cam connecting shaft 52 projects rightward from the right side of the base plate 27 (see FIGS. 8 through 10). When the three rotation retaining projections 47a are engaged in one small-diameter circular hole 55a, one large-diameter through-hole 55b and one elongated hole 55c, respectively, play between the three rotation retaining projections 47a and the one small-diameter circular hole 55a, the one large-diameter through-hole 55b and the one elongated hole 55c substantially disappears, so that the rotational cam 47 and the rotational center shaft 51 become integral with each other (in other words, the rotational cam 47 and the rotational center shaft 51 are prevented from rotating relative to each other). Therefore, rotating the rotational center shaft 51 on the axis thereof relative to the base plate 27 (to the bearing hole 29) causes the rotational cam 47 to rotate with the rotational center shaft 51. In addition, since all the through-holes formed in the annular flange 54 are not formed as the small-diameter circular holes 55a but are formed in the above described manner, the three rotation retaining projections 47a can be easily fitted into three holes (one of the pair of small-diameter circular holes 55a, one of the pair of large-diameter through-holes 55b and one of the pair of elongated holes 55c) formed in the annular flange 54.

The ratchet plate 57 is a press-molded metal product which is shaped into a disk. The ratchet plate 57 is provided on the outer edge of the right side thereof with a small-diameter annular flange 58 having a circular shape, so that an accommodation space is formed radially inside the small-diameter annular flange 58 on the right side of the ratchet plate 57. The ratchet plate 57 is provided at the center thereof with a bearing hole 59 formed as a through-hole which is circular in cross sectional shape. The ratchet plate 57 is provided, on the left side thereof at intervals of 90 degrees in the circumferential direction about the bearing hole 59, with a total of four welding protrusions 60 which project leftward. The ratchet plate 57 is provided on the outer edge of the left side thereof with an annular stepped portion 62 (see FIGS. 8 through 10) that is positioned in the back of the small-diameter annular flange 58. In addition, the ratchet plate 57 is provided on an inner peripheral surface of the small-diameter annular flange 58 with an internal gear 63. The ratchet plate 57 is further provided, at equi-angular intervals in the circumferential direction thereof on an inner peripheral surface of the small-diameter annular flange 58 which is positioned one step to the left of the internal gear 63, with three unlocked-state holding projections 57a which project toward the inner peripheral side (see FIGS. 2 and 21 through 23). As shown in the drawings, the inner periphery of each unlocked-state holding projection 57a is in the shape of a circular arc, the curvature center of which corresponds to the axis of the ratchet plate 57. The ratchet plate 57 is installed to cover the left side of the base plate 27 with the small-diameter annular flange 58 inserted into a clearance between the inner periphery of the large-diameter annular flange 28 and the outer peripheries of the three groove-forming projections 30. When the ratchet plate 57 is made to cover the base plate 27, the left side of the annular flange 54 faces the bottom (right side) of the aforementioned accommodation space of the ratchet plate 57 with a clearance formed therebetween, which prevents the rotational center shaft 51 from tilting relative to the axial direction thereof and prevents the two lock members 36, the lock member 37, the wedge 41 and the rotational cam 47 from rattling in the aforementioned accommodation spaces of the base plate 27 and the ratchet plate 57 in the axial direction of the rotational center shaft 51.

The retaining ring 64 is an annular ring member made of metal. The retaining ring 64 has a slightly greater outer diameter than that of the base plate 27. The retaining ring 64 is provided at the left end thereof with an annular adjacent portion 65 which projects toward the inner peripheral side (see FIGS. 8 through 10). The retaining ring 64 is fitted on the outer edges of the base plate 27 and the ratchet plate 57 with the annular adjacent portion 65 positioned on (opposed to) the left side of the annular stepped portion 62. The retaining ring 64 is provided on the right end thereof with an annular swaging portion 66. The retaining ring 64 is fixed to the base plate 27 by swaging the annular swaging portion 66 against an annular recess formed on the perimeter of the right side of the base plate 27. Once the base plate 27 and the retaining ring 64 are integrated (fixed to each other), the ratchet plate 57 is positioned between the base plate 27 and the retaining ring 64 so that the ratchet plate 57 is rotatable relative to the base plate 27 and the retaining ring 64 about the rotational center shaft 51 without coming off the base plate 27 or the retaining plate 64.

The lock spring 68 is a spiral spring that is formed by winding a metal belt into a spiral and is installed on the right side of the base plate 27. The end (inner end) of the lock spring 68 on the inner peripheral side is formed as a first locking portion 69 that is formed by bending the inner end of the lock spring 68 into a linear shape. The end (outer end) of the lock spring 68 on the outer peripheral side is formed as a second locking portion 70 which extends in a direction substantially parallel to a radial direction of the lock spring 68.

Figure 14:
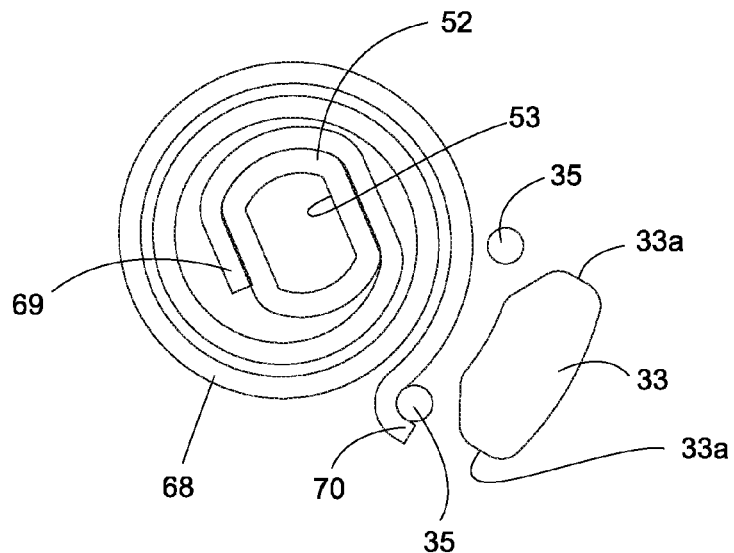
FIG. 14 is an enlarged side view of a portion of the base plate and a lock spring shown in FIGS. 2 and others.
Figure 15:
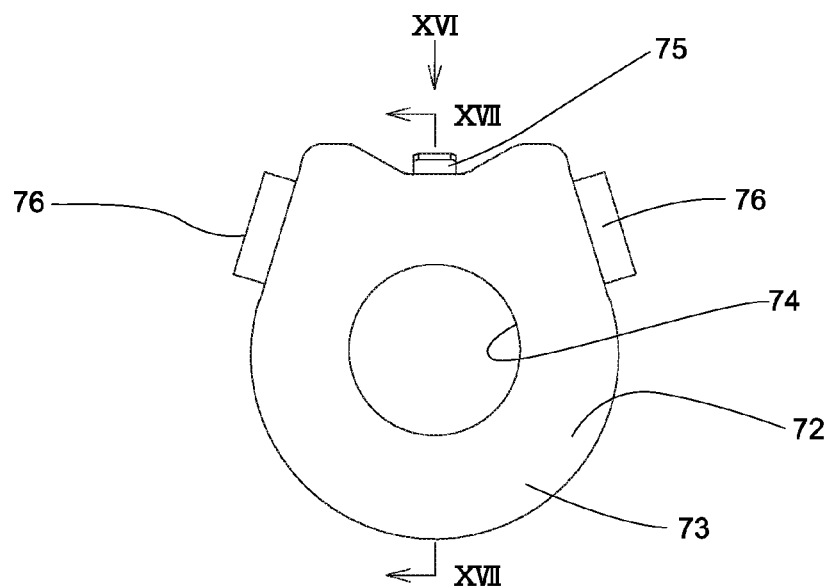
FIG. 15 is an enlarged side view of a spring cover shown in FIGS. 2 and others.
Figure 16:
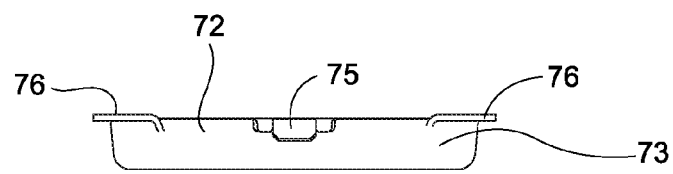
FIG. 16 is a diagram of the spring cover, viewed in the direction of the arrow XVI shown in FIG. 15.
Figure 17:
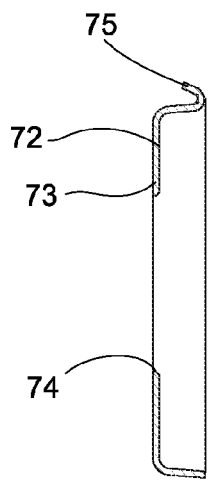
FIG. 17 is a cross sectional view taken along the line XVII-XVII shown in FIG. 15, viewed in the direction of the appended arrows.
Figure 18:
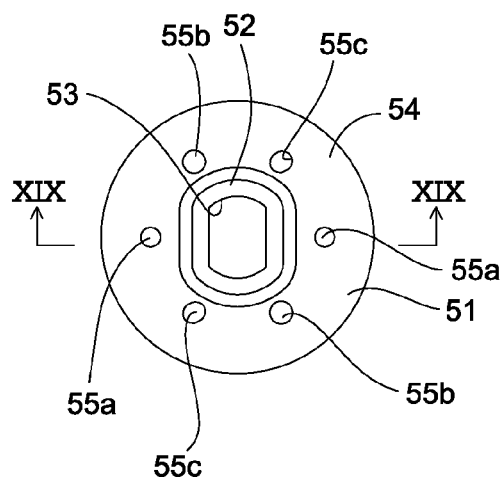
FIG. 18 is a right-side elevational view of a rotational center shaft shown in FIGS. 2 and others.
Figure 19:
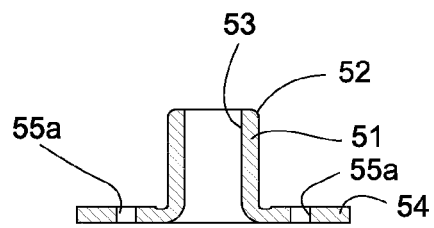
FIG. 19 is a cross sectional view taken along the line XIX-XIX shown in FIG. 18, viewed in the direction of the appended arrows.

The lock spring 68 is installed around the right end of the cam connecting shaft 52 that projects from the base plate 27. As shown in FIG. 14, the first locking portion 69 is locked onto a flat portion of the cam connecting shaft 52 which constitutes a portion of the outer periphery of the cam connecting shaft 52, while the second locking portion 70 is locked onto one of the locking projections 35.

When the lock spring 68 is installed onto the base plate 27 and the rotational center shaft 51 (the cam connecting shaft 52) in the above described manner, the lock spring 68 is slightly resiliently deformed to produce a biasing force that urges the rotational center shaft 51 to rotate in one direction. This biasing force urges the rotational center shaft 51 to rotate counterclockwise with respect to FIGS. 21 through 23, and accordingly, the rotational cam 47 is in the locked position shown in FIG. 21 when no external force other than the biasing force of the lock spring 68 is exerted on the rotational center shaft 51. When the rotational cam 47 is in the locked position, each lock-member pressing portion 47b presses the associated lock member 36 or 37 in a locking direction (toward the outer peripheral side). In addition, the curved pressing surface 50 of the specific cam projection 49 (specifically the upper cam projection 49 with respect to FIG. 21; the cam projection 49 shown in FIG. 24) of the rotational cam 47 presses the engaging portion 43 of the wedge 41 in a locking direction (toward the outer peripheral side), so that the wedge 41 slides toward the outer peripheral side of the base plate 27 while being guided by the flat guide surface 30a with which the slide-contact flat surface 45 of the wedge 41 is in surface contact, and the pressing portion 44 of the wedge 41 partly contacts and presses the pressed portion 39a with a large force. Therefore, the lock member 37 which is pressed both toward the flat guide surface 30a (which is positioned on the right-hand side of the lock member 37 with respect to FIG. 21) and in the locking direction moves to an engaged position in which the outer toothed portion 40 of the lock member 37 is engaged with internal gear 63 of the ratchet plate 57, so that the lock member 37 becomes immovable in the associated guide groove 31. On the other hand, each of the two lock members 36 is allowed to move in a circumferential direction within a gap defined between the associated guide groove 31 and the associated lock member 36, each lock member 36 comes into engagement with the internal gear 63 of the ratchet plate 57 while moving (adjusting) in a circumferential direction within the gap defined between the associated guide groove 31 and the associated lock member 36. Accordingly, when the rotational cam 47 rotates to the locked position, each of the three lock members (the two lock members 36 and the lock member 37) securely performs a locking operation, so that the base plate 27 and the ratchet plate 57 are prevented from rotating relative to each other. In addition, the outer peripheral surfaces of the engaging projections 40a of the three lock members 36 and 37 are positioned closer to the outer peripheral side than the inner peripheral surfaces of the three unlocked-state holding projections 57a.

On the other hand, rotating the rotational center shaft 51 clockwise with respect to FIGS. 21 through 23 against the rotational biasing force of the lock spring 68 causes the rotational cam 47, which is in the locked position, to rotate to the unlocked position shown in FIG. 22. Thereupon, each of the three lock-member pressing portions 47b is disengaged from the associated lock member 36 or 37 toward the inner peripheral side, thus causing the curved pressing surface 50 of the specific cam projection 49 (specifically, the upper cam projection 49 with respect to FIG. 21) of the rotational cam 47 to be disengaged in the circumferential direction from the engaging portion 43 of the wedge 41. Additionally, each cam projection 49 engages with the associated cam groove 38 to move the associated lock member 36 or 37 radially inwards to the disengaged position shown in FIG. 22, which causes the outer toothed portions 40 of the three lock members 36 and 37 and the internal gear 63 of the ratchet plate 57 to be disengaged from each other to thereby allow the base plate 27 and the ratchet plate 57 to rotate relative to each other. Additionally, the wedge 41 becomes freely movable in the associated guide groove 31 within the area surrounded by the associated flat guide surface 30a, the lock member 37 (the pressed portion 39a) and the rotational cam 47 (the associated cam projection 49). Additionally, the outer peripheral surfaces of the engaging projections 40a of the three lock members 36 and 37 are positioned closer to the inner peripheral side than the inner peripheral surfaces of the three unlocked-state holding projections 57a.

The spring cover 72 is made of metal and is mounted to the right side of the base plate 27. The spring cover 72 is formed from a metal plate by press molding. The base of the spring cover 72 includes a spring housing portion 73 which is non-circular in a side view and the entire left end surface thereof is open. A circular through-hole 74 is formed in the center of the spring housing portion 73. The spring cover 72 is provided on the outer edge of the left end of the spring housing portion 73 with an engaging projection 75, which is V-shaped in cross section and projects toward the outer peripheral side. In addition, the spring cover 72 is provided, on the outer edge of the left end of the spring housing portion 73 at different circumferential positions from the engaging projection 75, with two pressed lugs 76 which project toward the outer peripheral side. The two pressed lugs 76 are flat lugs which lie in a plane orthogonal to the leftward/rightward direction.

The spring cover 72 is installed onto the right side of the base plate 27 with the end of the cam connecting shaft 52 positioned in the circular through-hole 74 and with the spring housing portion 73 positioned between the three welding protrusions 33. Fitting the spring housing portion 73 into the space between the three welding protrusions 33 causes the retaining projections 34 of two of the three welding protrusions 33 to be engaged with two parts of the outer edge of the spring housing portion 73, respectively, and causes the retaining projection 34 of the remaining one welding protrusion 33 to be engaged with the end of the engaging projection 75. Accordingly, when the spring cover 72 is installed onto the right side of the base plate 27, the spring cover 72 becomes integral with the right side of the base plate 27.

Figure 6:
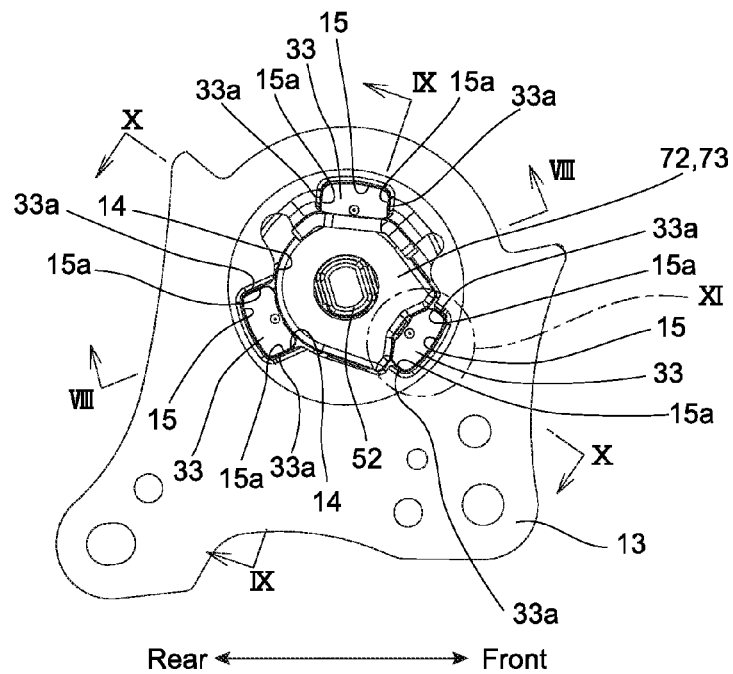
FIG. 6 is a right-side elevational view of the seat reclining apparatus in a locked state and a seat cushion side frame.
Figure 7:
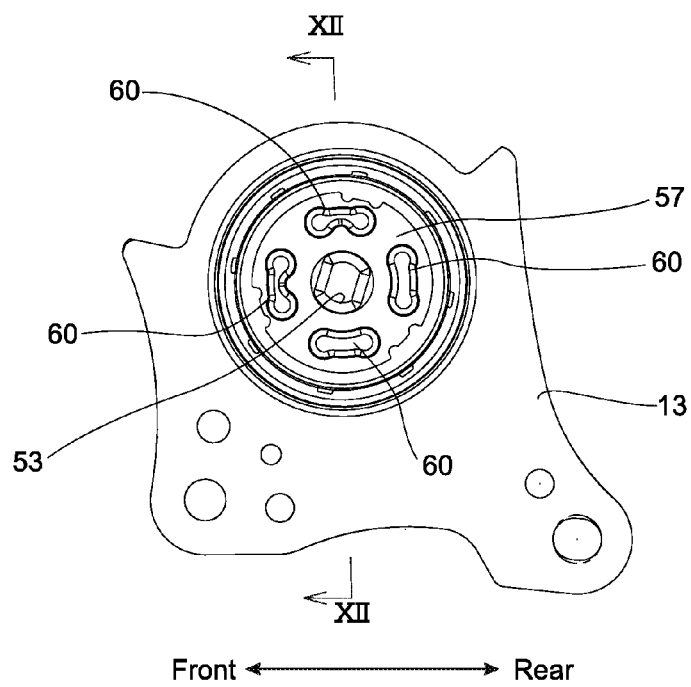
FIG. 7 is a left-side elevational view of the seat reclining apparatus in a locked state and a seat cushion side frame.
Figure 8:
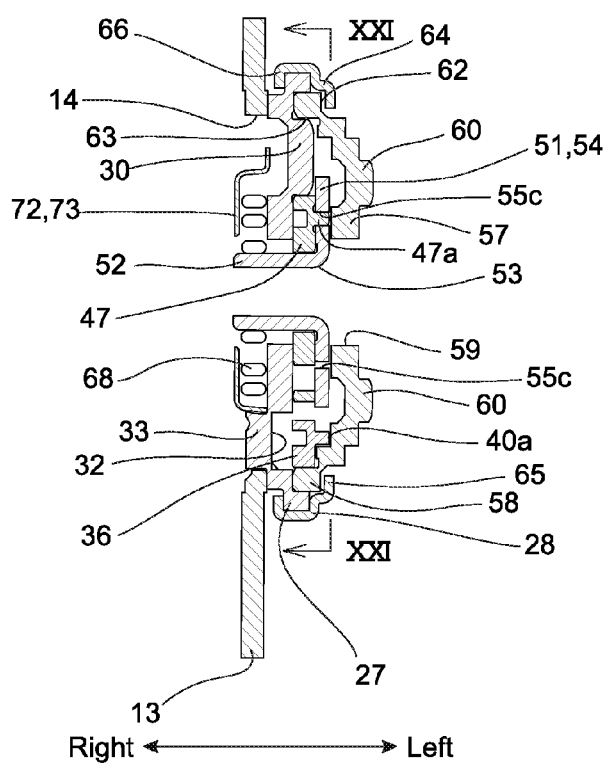
FIG. 8 is a cross sectional view taken along the line VIII-VIII shown in FIG. 6, viewed in the direction of the appended arrows.
Figure 9:
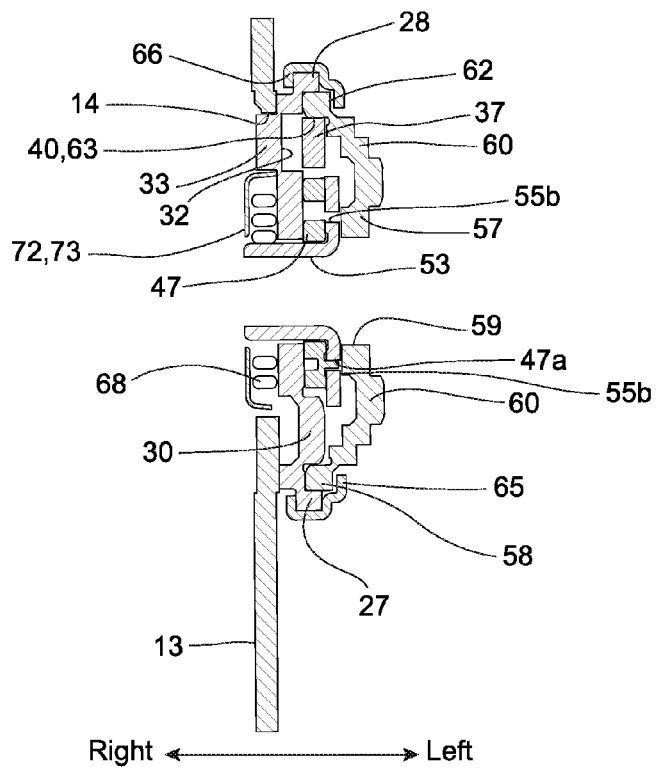
FIG. 9 is a cross sectional view taken along the line IX-IX shown in FIG. 6, viewed in the direction of the appended arrows.
Figure 10:
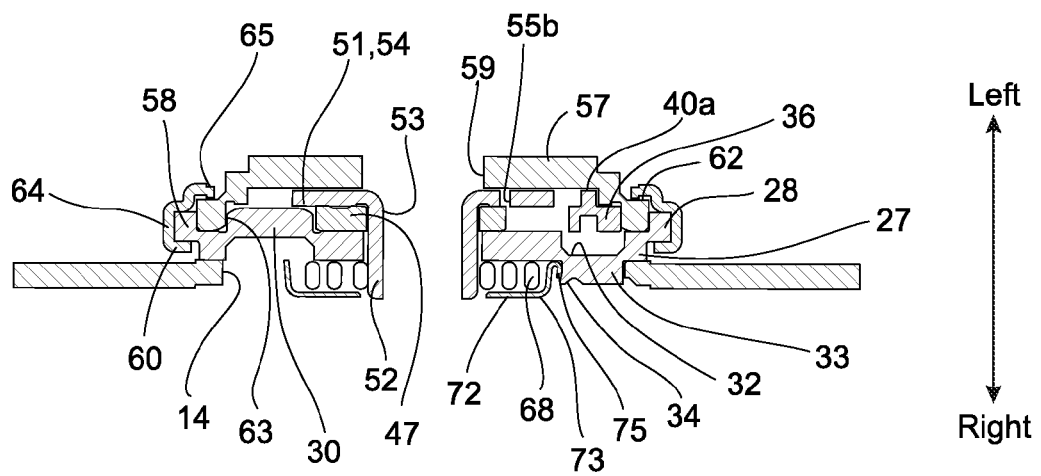
FIG. 10 is a cross sectional view taken along the line X-X shown in FIG. 6, viewed in the direction of the appended arrows.
Figure 11:
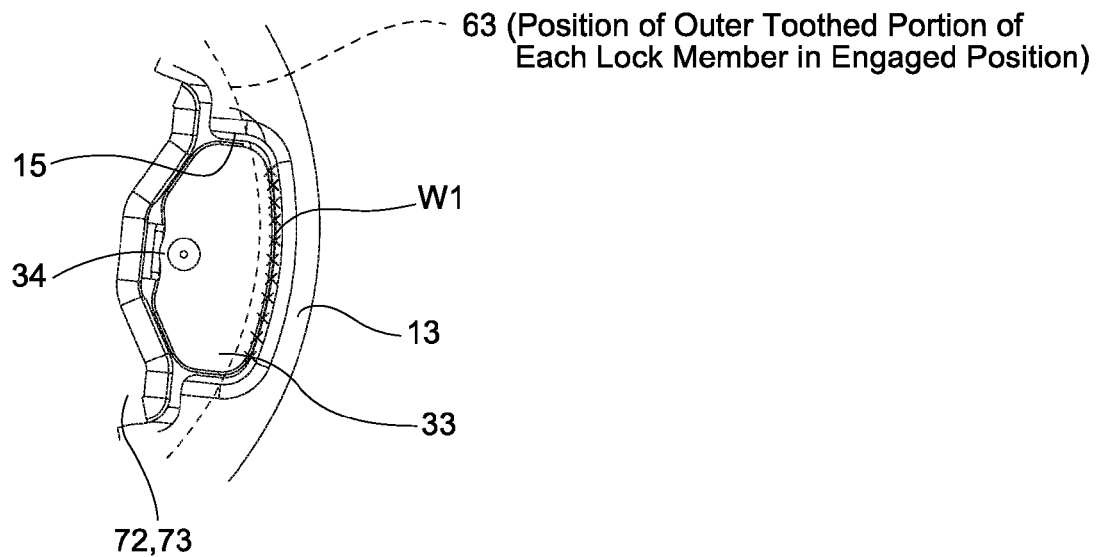
FIG. 11 is an enlarged view of a portion of the seat reclining apparatus which is designated by the Roman numeral XI shown in FIG. 6.

As shown in FIG. 6, the base plate 27 of the seat reclining apparatus 25 is installed onto the rear frame 13 with the three welding protrusions 33 of the base plate 27 respectively engaged in the three engaging holes 15 of the rear frame 13 and with the side end surfaces 33a of each welding protrusion 33 respectively being in surface contact with the pair of flat portions 15a of the associated engaging hole 15. The rear frame 13 and the base plate 27 are fixed to each other by applying a weld W1 (indicated by many small cross marks shown in FIG. 11 and hatch lines shown in FIG. 12), from the right side of the rear frame 13, to each of three welding portions (only one of which is shown in FIG. 11) each of which extends over an outer peripheral edge (right edge with respect to FIG. 11) of one engaging hole 15 and an outer peripheral edge of the right end surface of the associated welding protrusion 33. As shown in FIG. 11, the outer peripheral edge of the right end surface of each welding protrusion 33 (the position at which the weld W1 is applied) is positioned closer to the outer peripheral side than the position of the internal gear 63 (i.e., the positions of the outer toothed portions 40 of the three lock members 36 and 37 when each of the three lock members 36 and 37 is in the engaged position) and the outer peripheral edges of the three protrusion-corresponding recesses 32 (see FIGS. 11 and 13). In addition, when the base plate 27 is fixed to the rear frame 13, an inner side surface of the rear frame 13 (the outer edge of the seat-cushion-side connecting hole 14) comes in contact with the outer side surfaces of the two pressed lugs 76, which easily and securely prevents the spring cover 72 from coming off the right side of the base plate 27.

On the other hand, the ratchet plate 57 of the seat reclining apparatus 25 is fixed to the seatback side frame 16 by respectively engaging the four welding protrusions 60 in the four fitting holes 18 and applying a weld (not shown), from the left side of the seatback side frame 16, to an outer peripheral edge of each engaging hole 18 and an outer peripheral edge of the left end surface of the associated welding protrusion 60.

After the rear frame 13 and the seatback side frame 16 are connected to the seat reclining apparatus 25, a connecting shaft (not shown) having a non-circular cross sectional shape which extends leftward from the base end of an operating lever (operating member) 21 (see FIG. 1) is press-fitted into the connecting hole 53 of the cam connecting shaft 52 through the circular through-hole 74 of the spring cover 72 to be fixed to the rotational center shaft 51 (to the connecting hole 53). Therefore, rotating the operating lever 21 about the aforementioned connecting shaft causes the rotational center shaft 51 to rotate with the operating lever 21 (the aforementioned connecting shaft).

Operations of the vehicle seat 10 will be discussed hereinafter.

When no external force is applied to the operating lever 21, the operating lever 21 is held in the non-operating position shown by a solid line in FIG. 1 by the rotational biasing force of the lock spring 68. Additionally, when no external force is applied to the operating lever 21, the rotational cam 47 is in the locked position and the lock member 37 is in the engaged position, so that the seat reclining apparatus 25 is in a locked state. This prevents the seat cushion 11 (the rear frame 13), which is integral with the base plate 27, and the seatback 12 (the pair of seatback side frames 16), which is integral with the ratchet plate 57, from rotating relative to each other. On the other hand, rotating the operating lever 21 counterclockwise with respect to FIG. 1 to the operating position shown by a two-dot chain line in FIG. 1 against the rotational biasing force of the lock spring 68 causes the rotational cam 47 to rotate to the unlocked position, thus causing each of the two lock members 36 and the lock member 37 to move to the disengaged position, so that the seat reclining apparatus 25 comes into an unlocked state. This allows the seat cushion 11 (the rear frame 13), which is integral with the base plate 27, and the seatback 12 (the pair of seatback side frames 16), which is integral with the ratchet plate 57, to rotate relative to each other.

When the seatback 12 (the pair of seatback side frames 16) is in a first-stage locked position shown by a solid line in FIG. 1, rotating the operating lever 21 to the operating position to move the seat reclining apparatus 25 to the unlocked state causes the seatback 12 to rotate (tilt) forward by the rotational biasing force of a rotational biasing spring (not shown) installed in the vehicle seat 10. Thereupon, since the ratchet plate 57 rotates counterclockwise with respect to FIGS. 21 through 23 relative to the base plate 27, the seat reclining apparatus 25 comes into an unlocked holding state (i.e., a state in which the seat reclining apparatus 25 is held in the unlocked state) in which the three engaging projections 40a (the outer peripheral surface thereof) that are positioned closer to the inner peripheral side than the inner peripheral surfaces of the three unlocked-state holding projections 57a radially oppose (face) (to be in contact with) the inner peripheral surfaces of the three unlocked-state holding projections 57a, respectively, as shown in FIG. 23 (which shows a state of the interior of the seat reclining apparatus 25 when the seatback 12 has slightly rotated forward from the first-stage locked position). Therefore, the operating lever 21 is prevented from moving toward the non-operating position (the rotational cam 47 and the lock member 37 are also prevented from moving toward the locked position and the engaged position, respectively), so that the seatback 12 rotates to the aforementioned forwardly-tilted position (shown by a two-dot chain line designated by 12A in FIG. 1) by the rotational biasing force of the aforementioned rotational biasing spring. When the seatback 12 is positioned in between a position (shown in FIG. 23) slightly rotated forward from the first-stage locked position and the forward-tilted position (shown by a two-dot chain line designated by 12A in FIG. 1), the seat reclining apparatus 25 is held in the aforementioned unlocked holding state.

On the other hand, when the seatback 12 is positioned at or behind the first-stage locked position shown by a solid line in FIG. 1, if one rotates the operating lever 21 in the non-operating position to the operating position while applying a rearward force to the seatback 12 (e.g., by the back of an occupant sitting in the vehicle seat 10) to change the seat reclining apparatus 25 to an unlocked state, the seatback 12 rotates rearward. Subsequently, if one returns the operating lever 21 to the non-operating position upon tilting the seatback 12 to a desired rearward-tilted position, the rotational cam 47 moves back to the locked position while each lock member 36 and 37 moves back to the engaged position by the rotational biasing force of the lock spring 68, so that the seatback 12 (the pair of seatback side frames 16) is held at the desired tilted position.

The wedge 41 of the above described embodiment of the seat reclining apparatus 25 is provided with the slide-contact flat surface 45, which comes in surface contact with the adjacent flat guide surface 30a of the associated groove-forming projection 30. Therefore, when the seat reclining apparatus 25 is in the locked state, even if forward or rearward loads are exerted on the seatback 12 to thereby cause the aforementioned adjacent flat guide surface 30a and the slide-contact flat surface 45 to come into contact with each other with a large force due to, e.g., a vehicle which incorporates the seat reclining apparatus 25 colliding with another vehicle, concentrated loads do not easily occur between the aforementioned adjacent flat guide surface 30a (the associated groove-forming projection 30) and the wedge 41.

In addition, since the pressed portion 39a of the lock member 37 is a curved surface that is convex toward the wedge 41 though the pressing portion 44 of the wedge 41 is flat in shape, even if an error exits between the shape of the wedge 41 (the pressing portion 44) and the design shape thereof, there is little possibility of the wedge 41 becoming positionally unstable when the rotational cam 47 rotates, so that the operation of the wedge 41 does not easily become unsmooth.

Additionally, since the press portion 39a of the lock member 37 has a profile that is close to that of the pressing portion 44 of the wedge 41 (has a curved profile that is close to a flat surface), the wedge 41 (the pressing portion 44) or the lock member 37 (the pressed portion 39) easily deforms plastically into the same shape as the pressed portion 39a of the lock member 37 or the pressing portion 44 of the wedge 41, respectively, when the pressing portion 44 of the wedge 41 and the pressed portion 39a of the lock member 37 come into contact with each other with a large force due to, e.g., a vehicle which incorporates the seat reclining apparatus 25 colliding with another vehicle. If one of the pressing portion 44 of the wedge 41 and the pressed portion 39a of the lock member 37 becomes deformed into the same shape as the other, the contact state between the pressing portion 44 of the wedge 41 and the pressed portion 39a of the lock member 37 becomes a surface contact state, which reduces the possibility of large concentrated loads occurring therebetween. Accordingly, one or both of the wedge 41 and the lock member 37 can be efficiently prevented from being deformed or damaged.

In addition, the seat reclining apparatus 25 has only one wedge (the wedge 41) while having more than one lock member (the two lock members 36 and the lock member 37). Therefore, when the outer toothed portion 40 of the lock member 37 which is pressed in the locking direction by the wedge 41 is engaged with the internal gear 63 of the ratchet plate 57, the positions of the lock member 37 and the ratchet plate 57 are fixed (a positional reference is determined), and the lock member 37 becomes immovable in the associated guide groove 31. On the other hand, each of the remaining two lock members 36 is allowed to move in a circumferential direction within the gap defined between the associated guide groove 31 and the associated lock member 36, thus being engaged with the internal gear 63 of the ratchet plate 57 while moving, as appropriate, in a circumferential direction within the gap defined between the associated guide groove 31 and the associated lock member 36. Accordingly, since all the three lock members, i.e., the two lock members 36 and the lock member 37, operate with reliability when the rotational cam 47 rotates, the seat reclining apparatus 25 can reliably perform locking and unlocking operations.

Additionally, when the seat reclining apparatus 25 comes into the locked state, the wedge 41 comes into contact with the following three members: the rotational cam 47, the lock member 37 and the base plate 27 (the adjacent flat guide surface 30a of the associated groove-forming projection 30), so that the behavior of the wedge 41 is appropriately controlled.

Additionally, the wedge 41 has the concave surface 46a that forms a clearance between the wedge 41 and the associated curved pressing surface 50 of the rotational cam 47 when facing the associated curved pressing surface 50 of the rotational cam 47 as shown in FIG. 24. The concave surface 46a is a concave surface which faces a protrusion constituting the associated curved pressing surface 50 and has a shape capable of approaching the associated curved pressing surface 50, and accordingly, the clearance between the associated curved pressing surface 50 of the rotational cam 47 and the concave surface 46a when the rotational cam 47 is in the unlocked position is narrow.

If an occupant pushes the seatback 12 rearward or forward when the seat reclining apparatus 25 is in the locked state, a force in the circumferential direction of the base plate 27 is exerted on the outer toothed portion 40 of each of the two lock members 36 and the lock member 37 from the internal gear 63 of the ratchet plate 57, and a component of this force which is directed toward the inner peripheral side becomes a force urging the two lock members 36, the lock member 37 and the wedge 41 toward the inner peripheral side (toward the rotational cam 47 side).

In this state, upon an occupant unlocking the seat reclining apparatus 25, the curved pressing surface 50 of the rotational cam 47 moves away from the wedge 41 in the circumferential direction of the rotational cam 47 (the base plate 27). Thereupon, the wedge 41 which receives the aforementioned component of force (which is directed toward the inner peripheral side) moves toward the rotational cam 47. However, since the clearance between the concave surface 46a of the wedge 41 and the associated curved pressing surface 50 of the rotational cam 47 is narrow (the distance therebetween is small) as mentioned above, a high collision speed of the wedge 41 against the rotational cam 47 does not easily occur even if the concave surface 46a of the wedge 41 collides with the associated curved pressing surface 50 of the rotational cam 47, so that the possibility of a loud sound (noise) of such a collision being produced between the wedge 41 (the concave surface 46a) and the rotational cam 47 (the associated curved pressing surface 50) is small.

Additionally, the pair of small-diameter circular holes 55a, the pair of large-diameter through-holes 55b and the pair of elongated holes 55c are formed in the annular flange 54 that rotates with the rotational center shaft 51, and the three rotation retaining projections 47a are projected from the rotational cam 47 to be engaged in one of the pair of small-diameter circular holes 55a, one of the pair of large-diameter through-holes 55b and one of the pair of elongated holes 55c, respectively. Therefore, when the rotational center shaft 51 rotates, this rotational operating force is transmitted to the three rotation retaining projections 47a via the one of the pair of small-diameter circular holes 55a, the one of the pair of large-diameter through-holes 55b and the one of the pair of elongated holes 55c that are formed in the annular flange 54. The magnitude of the force transmitted from the rotational center shaft 51 (the annular flange 54) to the rotational cam 47 is equal to the magnitude of the rotation moment (torque) of the rotational center shaft 51 (the annular flange 54) divided by the direct distance (distance in a radial direction of the annular flange 54) from the axis of the rotational center shaft 51 to the one of the pair of small-diameter circular holes 55a, the one of the pair of large-diameter through-holes 55b or the one of the pair of elongated holes 55c. Since the pair of small-diameter circular holes 55a, the pair of large-diameter through-holes 55b and the pair of elongated holes 55c, which are formed in the annular flange 54, are positioned closer to the outer peripheral side than the cam connecting shaft 52 (the non-circular center hole 48 of the rotational cam 47), the aforementioned direct distance is longer than the radius of the cam connecting shaft 52 (the radius of the non-circular center hole 48 of the rotational cam 47). Therefore, the force transmitted from the rotational center shaft 51 (the annular flange 54) to the rotational cam 47 does not become too large.

Accordingly, even if a force urging the operating lever 21 to rotate beyond a predetermined normal range of rotation is produced (even if a force urging the operating lever 21 to rotate in the direction reverse to the operating position beyond the non-operating position or in the direction reverse to the non-operating position beyond the operating position is produced) as a result of, e.g., a foot of an occupant accidentally coming into contact with the operating lever 21, the possibility of the rotational cam 47 or the rotational center shaft 51 (the annular flange 54) being deformed is small.

Additionally, the three welding portions (to each of which the weld W1 has been applied), which are formed on outer peripheral portions of the three welding protrusions 33 that are projected from the base plate 27, are positioned closer to the outer peripheral side than the outer toothed portions 40 of the three lock members 36 and 37 which are positioned in the engaged position. Therefore, the possibility of heat of the weld W1 reaching and deforming a portion of the bottom of each of the three guide groove 31 on which the associated lock member 36 or 37 slides (e.g., deforming this portion so that it protrudes toward the associated lock member 36 or 37) is small. Additionally, even if heat of the weld W1 reaching each of the three protrusion-corresponding recesses 32, which are respectively positioned directly behind the three welding protrusions 33, and the inner surfaces of the three protrusion-corresponding recesses 32 are deformed by this heat, this deformation has no effect on the operation of each lock member 36 and 37 because the inner surfaces of the three protrusion-corresponding recesses 32 are spaced from the three lock members 36 and 37. Accordingly, the possibility of each lock member 36 and 37 becoming incapable of sliding on an inner side surface (the associated guide groove 31) of the base plate 27 due to heat of the weld W1 is small.

Additionally, since the pair of side end surfaces 33a of each welding protrusion 33 are in surface contact with the pair of flat portions 15a of the associated engaging hole 15, it is possible to secure a large contact area between each welding protrusion 33 (the pair of side end surfaces 33a) and the associated engaging hole 15 (the pair of flat portions 15a). Accordingly, even if a collision load occurs between the pair of side end surfaces 33a of each welding protrusion 33 and the pair of flat portions 15a of the associated engaging hole 15 due to, e.g., a vehicle which incorporates the seat reclining apparatus 25 colliding with another vehicle, the seat reclining apparatus 25 can exhibit high resistance to this collision load.

Although the present invention has been described based on the above illustrated embodiment of the seat reclining apparatus, the present invention is not limited solely to this particular embodiment; various modifications to the above illustrated embodiment of the seat reclining apparatus are possible.

For instance, it is possible to fix the base plate 27 to the pair of seatback side frames 16 and fix the ratchet plate 57 to the rear frame 13.

In addition, the left rear frame 13 (the left seat cushion frame) and the left seatback side frame 16 can be connected to each other via the seat reclining apparatus 25 instead of the right rear frame 13 (the right seat cushion frame) and the right seatback side frame 16 being connected to each other via the seat reclining apparatus 25. Additionally, it is possible to connect the left and right rear frames 13 and the left and right seatback side frames 16 to each other via left and right seat reclining apparatuses 25, respectively, and connect the rotational center shafts 51 of the left and right seat reclining apparatuses 25 to each other via a connecting pipe, or the like, so that the left and right seat reclining apparatuses 25 move in synchronization with each other.

Since the wedge 41 is symmetrical in shape with respect to the straight line L1 as shown in FIG. 25, the wedge 41 can also be applied to the left seat reclining apparatus 25 in the case where the seat reclining apparatus 25 is installed to each of the left and right sides of the vehicle seat 10 (or in the case where the seat reclining apparatus 25 is installed only onto the left side of the vehicle seat 10).

Additionally, it is possible to form the pressed portion 39a of the lock member 37 into a linear (flat) shape and form the pressing portion 44 of the wedge 41 into a curved surface (corresponding to the curved surface of the pressed portion 39a in the above described embodiment, which is smaller in curvature than the engaging portion 43 of the wedge 41) which is convex toward the pressed portion 39a.

Figure 26:
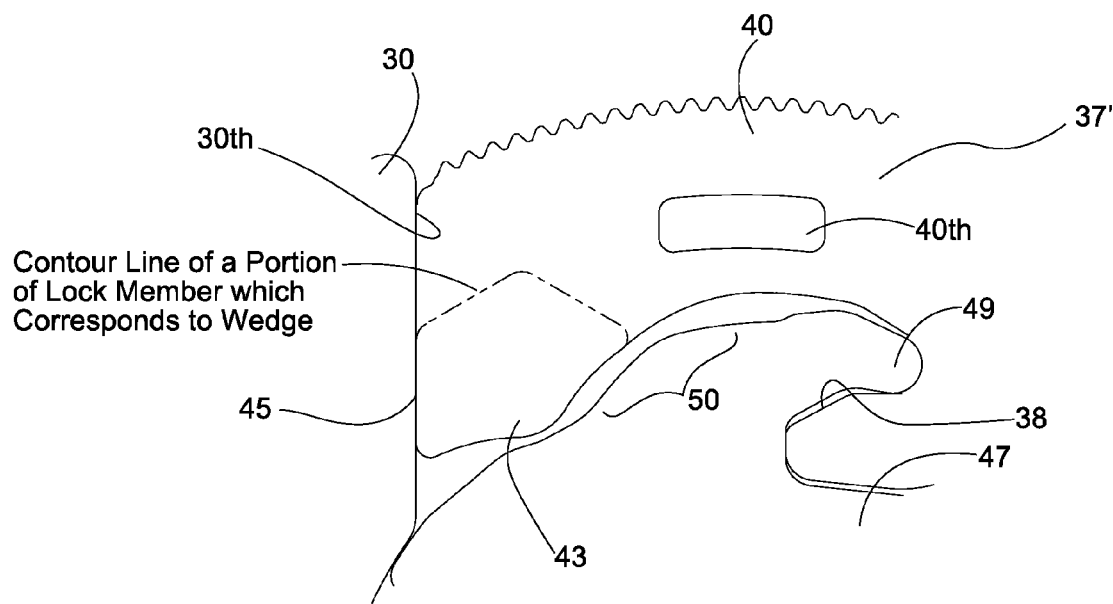
FIG. 26 is a view similar to that of FIG. 24, illustrating a modified embodiment of the seat reclining apparatus

Additionally, as shown in FIG. 26, the lock member 37 and the wedge 41 can be replaced by an integral-type lock member 37', the shape of which corresponds to the shape of an integral combination of the lock member 37 and the wedge 41 (note that a two-dot chain line shown in FIG. 26 shows a contour line of a portion of the integral-type lock member 37' which corresponds to the wedge 41).

The seat reclining apparatus according to the present invention can be provided with a plurality of wedges, each of which corresponds to the wedge 41, and a plurality of lock members (each of which has the wedge-engaging groove 39) can be pressed by the plurality of wedges. In this case, the number of the plurality of wedges can be equal to or less than the number of the plurality of lock members.

In addition, the wedge 41 can be omitted.

Additionally, the curved pressing surface 50 of the rotational cam 47 is not required to be a curved surface so long as it is formed into a shape that is convex toward the concave surface 46a of the wedge 41; on the other hand, the concave surface 46a of the wedge 41 is also not required to be a curved surface so long as it is formed into a shape that is concave toward the opposite side from the associated curved pressing surface 50 of the rotational cam 47.

Additionally, it is possible for the rotational center shaft 51 to be provided, on the annular flange 54 side thereof, with rotation retaining projections corresponding to the rotation retaining projections 47a and for the rotational cam 47 to be provided with a small-diameter circular hole(s), a large-diameter through-hole(s) and an elongated hole(s) corresponding to the small-diameter circular hole(s) 55a, the large-diameter through-hole(s) 55b and the elongated hole(s) 55c, respectively.

Additionally, the number of rotation retaining projections 47a and the number of holes 55a, 55b and 55c can each be one in either case where rotation retaining projections corresponding to the three rotation retaining projections 47a and holes corresponding to the holes 55a, 55b and holes 55c are formed on the rotational cam 47 and the rotational center shaft 51 or the rotational center shaft 51 and the rotational cam 47, respectively.

Additionally, the three engaging holes 15 of the rear frame 13 can be formed as bottomed holes, the ends of which on the opposite side of the rear frame 13 from the base plate 27 side are closed, rather than as through-holes.

Additionally, the three protrusion-corresponding recesses 32 can be omitted from the base plate 27 by, e.g., forming the base plate 27 by forging.

Additionally, a through-hole (as a substitution for the bearing hole 29) greater in diameter than the bearing hole 29 can be formed in the center of the base plate 27 to install the lock spring 68 in this through-hole (within the plate thickness of the base plate 27).

Figure 2:
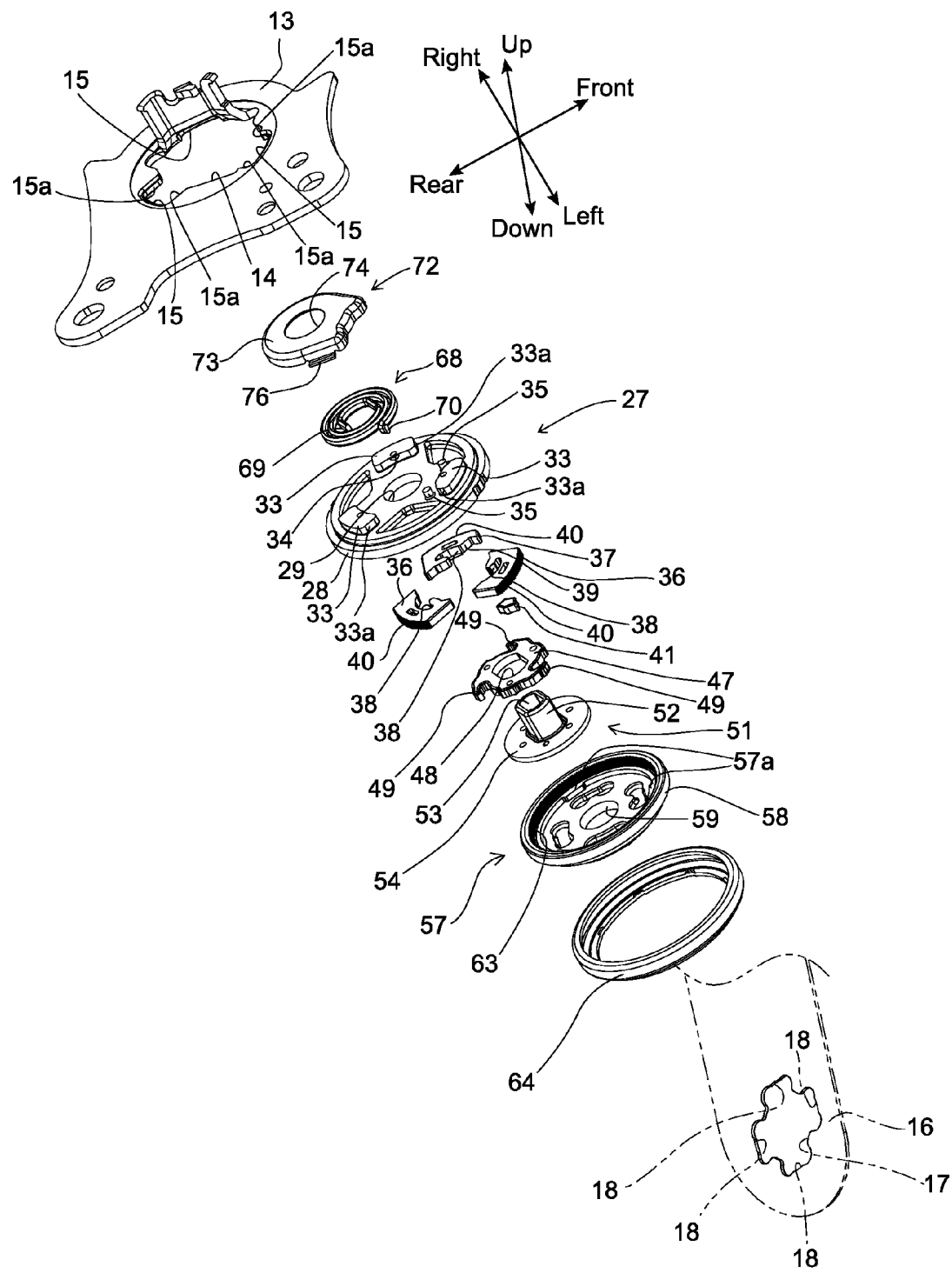
FIG. 2 is an exploded perspective view of the seat reclining apparatus.
Figure 3:
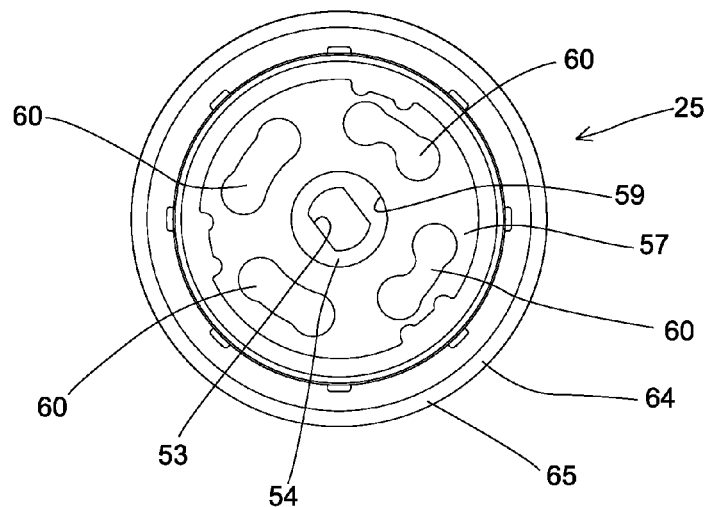
FIG. 3 is a left-side elevational view of the seat reclining apparatus.
Figure 4:
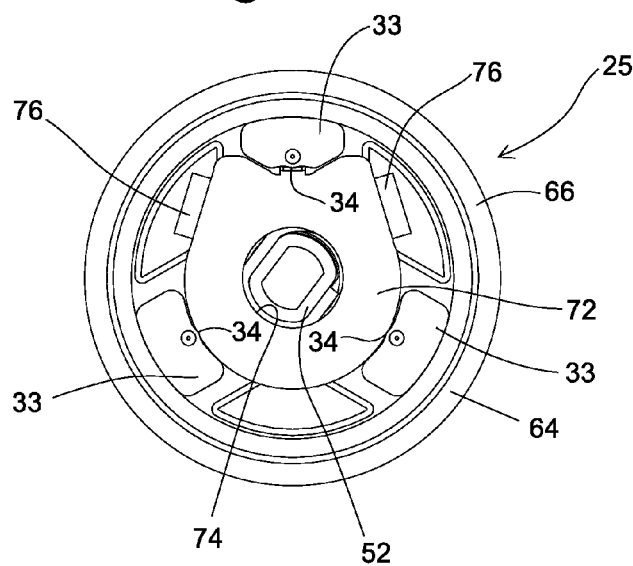
FIG. 4 is a right-side elevational view of the seat reclining apparatus.
Figure 5:
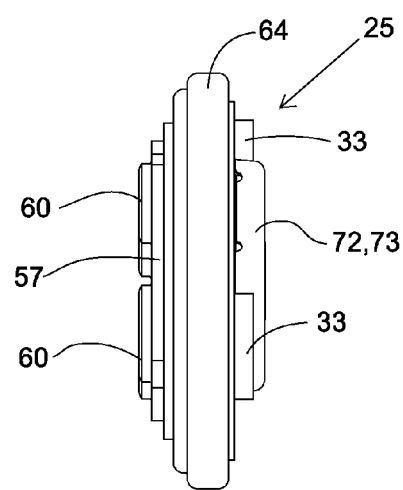
FIG. 5 is a rear elevational view of the seat reclining apparatus.

Additionally, the lock spring 68 and the spring cover 72 can be installed onto the left side of the ratchet plate 57, or a through-hole (as a substitution for the bearing hole 59) greater in diameter than the bearing hole 59 can be formed in the center of the ratchet plate 57 to install the lock spring 68 (which is installed onto the left side of the ratchet plate 57) in this through-hole (within the plate thickness of the ratchet plate 57). In this case, the inner side of the seatback side frame 16 (the edge of the seatback-side connecting hole 17), that is shown by two-dot chain lines in FIG. 2, is made to contact the outer peripheries of the two pressed lugs 76.

The seat reclining apparatus 25 can be modified to be a so-called swing-pawl type in which each lock member (pawl) is allowed to move not only linearly in a radial direction of the base plate 27 relative to the base plate 27 but also in a radial direction of the base plate 27 while swinging relative to the base plate 27.

In this case, the circumferentially opposite surfaces of each lock member 36 and 37 that respectively face the flat guide surfaces 30a in the associated guide groove 31 can be formed as flat surfaces, or the flat guide surfaces 30a can be replaced by curved guide surfaces while the circumferentially opposite surfaces of each lock member that respectively face the aforementioned curved guide surfaces 30a can be formed as curved surfaces (surface contact portions) which can be in surface contact with the aforementioned curved guide surfaces 30a.

The seat reclining apparatus 25 can be modified into a so-called release type that incorporates a release plate which is linked with the rotational cam 47 and the three lock members 36 and 37 instead of omitting the three cam projections 49 from the rotational cam 47.

Additionally, the number of the welding protrusions 33 is not limited to three.

Furthermore, the aforementioned connecting shaft (not shown) of the operating lever 21 can be retained so as not to come off the connecting hole 53 by installing a push nut onto the end of the connecting shaft after the connecting shaft is inserted into the connecting hole 53.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A seat reclining apparatus comprising:
 a base plate, an outer side of which faces one of a seat cushion side frame and a seatback side frame;
 a ratchet plate which includes an internal gear, said ratchet plate being fixed to the other of said seat cushion side frame and said seatback side frame so as to face said base plate while being rotatable relative thereto;
 a lock member supported on a surface of said base plate which faces said ratchet plate so that said lock member is movable between an engaged position in which an outer toothed portion formed on an outer peripheral surface of said lock member is engaged with said internal gear of said ratchet plate and a disengaged position in which said outer toothed portion is disengaged from said internal gear of said ratchet plate toward an inner peripheral side;
 a rotational cam which is positioned between said base plate and said ratchet plate and rotates relative to said base plate and said ratchet plate in association with an operation of an operating member between a locked position to position said lock member in said engaged position and an unlocked position to position said lock member in said disengaged position;

a welding protrusion which protrudes from said outer side of said base plate and is engaged with a holding portion, which is formed as one of a through-hole and a bottomed hole in said one of said seat cushion side frame and said seatback side frame; and a protrusion-corresponding recess formed in said surface of said base plate at a position corresponding to a position of said welding protrusion, and which faces said ratchet plate, wherein said outer toothed portion of said lock member, at said engaged position, is positioned radially inside an outer peripheral surface of said protrusion-corresponding recess, wherein said outer peripheral surface is closest to the periphery of said base plate, wherein said welding protrusion includes a welding portion, at an outer edge of said welding protrusion, which is offset from said outer toothed portion so as to be positioned radially closer to an outer peripheral edge of said base plate than said outer toothed portion of said lock member in said engaged position, and wherein a weld is applied so as to extend over said welding portion and an outer edge of said holding portion.

2. The seat reclining apparatus according to claim 1, wherein said base plate is a press-molded product, and wherein said lock member and said protrusion-corresponding recess are positioned to face each other.

3. The seat reclining apparatus according to claim 1, wherein said welding protrusion comprises a pair of side end surfaces which are flat and spaced from each other in a rotational direction of said ratchet plate relative to said base plate, and wherein said holding portion includes a pair of flat portions which face said pair of side end surfaces of said welding protrusion, respectively.

4. The seat reclining apparatus according to claim 1, wherein said welding portion is offset to prevent deformation of said base plate into said lock member at said weld.

5. The seat reclining apparatus according to claim 1, further comprising a wedge to press said locking member into a locking direction in said engaged position.

6. The seat reclining apparatus according to claim 5, wherein said wedge includes a pressing portion to contact a pressed portion of said locking member.

7. The seat reclining apparatus according to claim 5, wherein said locking member includes a wedge-engaging groove to receive said wedge.

8. The seat reclining apparatus according to claim 1, wherein said internal gear of said ratchet plate is positioned at said inside of said outer peripheral surface of said protrusion-corresponding recess, and wherein said outer peripheral surface is closest to the periphery of said base plate.

* * * * *